United States Patent [19]

Hideshima

[11] Patent Number: 5,590,941
[45] Date of Patent: Jan. 7, 1997

[54] PRINTED MATERIAL READER AND SEARCH METHOD THEREFOR

[75] Inventor: Takahiro Hideshima, Kanagawa, Japan

[73] Assignee: Fuji Photo Film Co., Ltd., Kanagawa, Japan

[21] Appl. No.: 611,576

[22] Filed: Mar. 6, 1996

[30] Foreign Application Priority Data

Mar. 7, 1995 [JP] Japan .................................. 7-072460

[51] Int. Cl.$^6$ ............................................. G03B 21/00
[52] U.S. Cl. ...................................... 353/26 A; 353/25
[58] Field of Search ...................................... 353/25, 26 R, 353/26 A, 120

[56] References Cited

U.S. PATENT DOCUMENTS

| | | | |
|---|---|---|---|
| 4,607,950 | 8/1986 | Ishii et al. | 353/26 A |
| 4,687,321 | 8/1987 | Itoh | 353/26 A |
| 4,825,065 | 4/1989 | Imai | 353/26 A |
| 4,899,194 | 2/1990 | Hori | 355/56 |
| 5,038,379 | 8/1991 | Sano | 353/26 A |
| 5,416,605 | 5/1995 | Hideshima et al. | 353/26 A |

*Primary Examiner*—William Dowling
*Attorney, Agent, or Firm*—Sughrue, Mion, Zinn, Macpeak & Seas

[57] ABSTRACT

A printed material reader that searches for a desired frame by using blips provided on a printed material, and that prevents search errors due to variances in blip lengths. Before a search of a desired frame, the lengths of the blips adjacent to all the frames on the printed material are detected, and the permissible ranges for the blips are determined from a frequency histogram reflecting relative distributions of the blip lengths detected. The blips whose length fall within permissible ranges are counted to search for a desired frame on the microfilm.

4 Claims, 8 Drawing Sheets

PRINTED MATERIAL READER AND SEARCH METHOD THEREFOR

BACKGROUND OF THE INVENTION

1. Field of the Invention

The present invention relates to a printed material reader, such as a microfilm reader which searches for a desired frame by using blips recorded or photographed on the printed material, and to a search method therefor.

2. Related Art

There is a well known microfilm search method, wherein blips (rectangular marks) are photographed beside the frames on microfilm and used as reference marks. The blips are read by a blip reader and are counted, and the blip count is used to identify frame addresses when a specific frame is sought. This method is also referred to as a document mark method.

For this method, blips having different lengths, for example, long, medium and short blips, are employed to represent a plurality of classification levels corresponding to a certain criteria. For example, a long blip would represent a high level, a medium blip would represent an intermediate level, and a short blip would represent a low level.

In this blip method, however, it is difficult for the length of a blip to be accurately detected, because such detection has to be performed while the microfilm is being fed at a high speed, and because of a property of the blip reader itself, detected blip lengths may vary. Further, when images on microfilm are reproduced (duplicated), films are placed on top of one another to facilitate the transfer of the images, and as the edges of the blips are not sharply defined, due to the thickness of the film, the length of the blips is therefore slightly changed during duplication.

Since variances in the detected blip lengths occur in this manner, predetermined permissible ranges can be determined and with frames to be searched. However, because of the properties of the blip readers and the properties of the microfilm, the detected lengths of the blips tend to constantly fluctuate. That is, blips on some film tend to shift so that they are longer relative to the permissible ranges, and blips on the other film tend to shift so that they are shorter relative to the permissible ranges.

Therefore, if constant permissible ranges are set, blip detection errors tend to occur and accurate detection is not be possible.

SUMMARY OF THE INVENTION

The present invention has been accomplished under the circumstances above, and a first object thereof is to provide a method for searching desired frames on microfilm, which enables blips to be accurately detected and prevents the occurrence of errors during searches for desired frames, even though there are variations in the actual lengths of blips and even though the detected lengths of blips tend to be longer or shorter than the actual lengths.

A second object of the present invention is to provide a microfilm reader which uses of the above search method.

The first object of the present invention is attained by the provision of a method for searching a desired frame by detecting blips on a microfilm, comprising the steps of:

a) detecting lengths of all blips adjacent to frames on said microfilm;

b) determining permissible ranges for blip lengths from a frequency histogram reflecting relative distributions for said lengths of said blips that are detected; and c) counting blips whose lengths fall within said permissible ranges, and searching for said desired frame on said microfilm.

The second object of the invention is attained by the provision of a microfilm reader which searches for a desired frame by detecting blips on a microfilm, comprising:

a) a blip sensor for detecting said blips;

b) a rotary encoder for detecting a running speed of said microfilm;

c) blip length setup means for detecting lengths of all blips adjacent to frames on said microfilm, in consonance with outputs of said blip sensor and said rotary encoder, and for determining permissible ranges for blip lengths from a frequency histogram reflecting relative distributions for said lengths of said blips; and d) search means for counting blips whose lengths fall within said permissible ranges and for searching for said desired frame.

DETAILED DESCRIPTION OF THE PREFERRED EMBODIMENT

Figure 1:
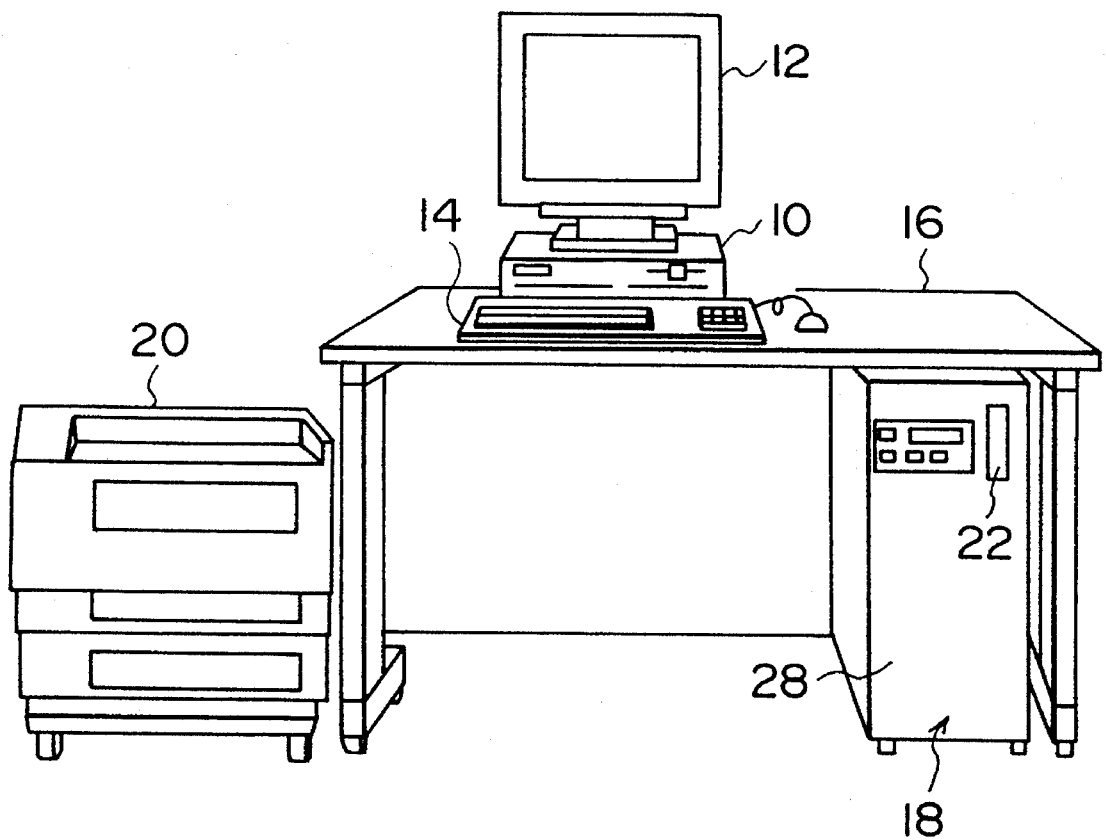
FIG. 1 is a diagram showing all the parts of an image reading and processing apparatus which incorporates a microfilm reader of an embodiment according to the present invention.

In FIG. 1, a reference numeral 10 denotes a computer body containing a CPU or other processing means. A display means 12 such as a CRT or a liquid crystal panel and a keyboard 14 are placed on a desk 16. A scanner 18 is stored under the desk 16 and a printer 20 is placed beside the desk 16.

The scanner 18 has a cartridge insertion port 22 formed in the upper portion of the front panel. The scanner 18 reads, at a low resolution, an image recorded on a microfilm 26 held in a cartridge 24 (see FIGS. 2 and 3) which is loaded through the insertion port 22. The CPU in the computer body 10 performs predetermined image processing of the read image, and the resultant image is displayed on the display means 12.

The reading or scanning operation of the image is carried out while the roll film moves without moving a line sensor 96, which will be described hereinafter. During this process, the CRT display device 12 sequentially changes and displays the read image synchronously with the travel of the film 26. Therefore, the displayed image is moved in the display surface of the CRT 12 is in synchronization with the travel of the film 26, so that the displayed image may be substantially the same as that which is projected on a screen.

For a manual search, an operator monitors the display means 12 and instructs a print output for a required image on the display means 12. In response to this output instruction, the scanner 18 sets a corresponding frame at the correct position, and reads the image on the frame at a high resolution. The high density image is printed by the printer 20, and either stored in an optical magnetic disk or transferred to an external processor.

Figure 6:
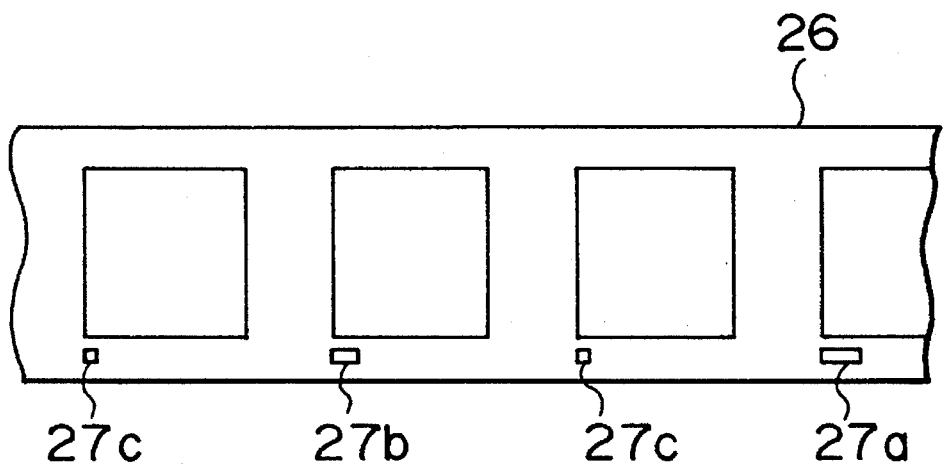
FIG. 6 is a diagram showing blips recorded on a microfilm.

For an automatic search, the address of a desired frame is input through the keyboard 14. As shown in FIG. 6, since blips 27 (27a, 27b and 27c) have been photographed adjacent to the frames on the microfilm 26, the scanner 18 reads these blips 27 with a blip reader, and the number of blips is counted to search for a desired frame. A search method that uses the blips will be described later.

The structure of the scanner 18 will now be described. The scanner 18 has a vertically longitudinal casing 28, in which there are arranged a feed reel driving unit 30 at the upper portion of the front side and a take-up reel driving unit 32 at the lower portion of the front side. When the cartridge 24 is inserted into the cartridge insertion port 22, the cartridge 24 is moved automatically so that a reel 24A held in the cartridge engages with a rotating shaft of the feed reel driving unit 30. And then, the feed reel driving unit 30 pulls out the leader portion of the roll film 26 from the cartridge 24 and feeds it downward to guide it to a take-up reel 32A in the take-up reel driving unit 32.

Figure 2:
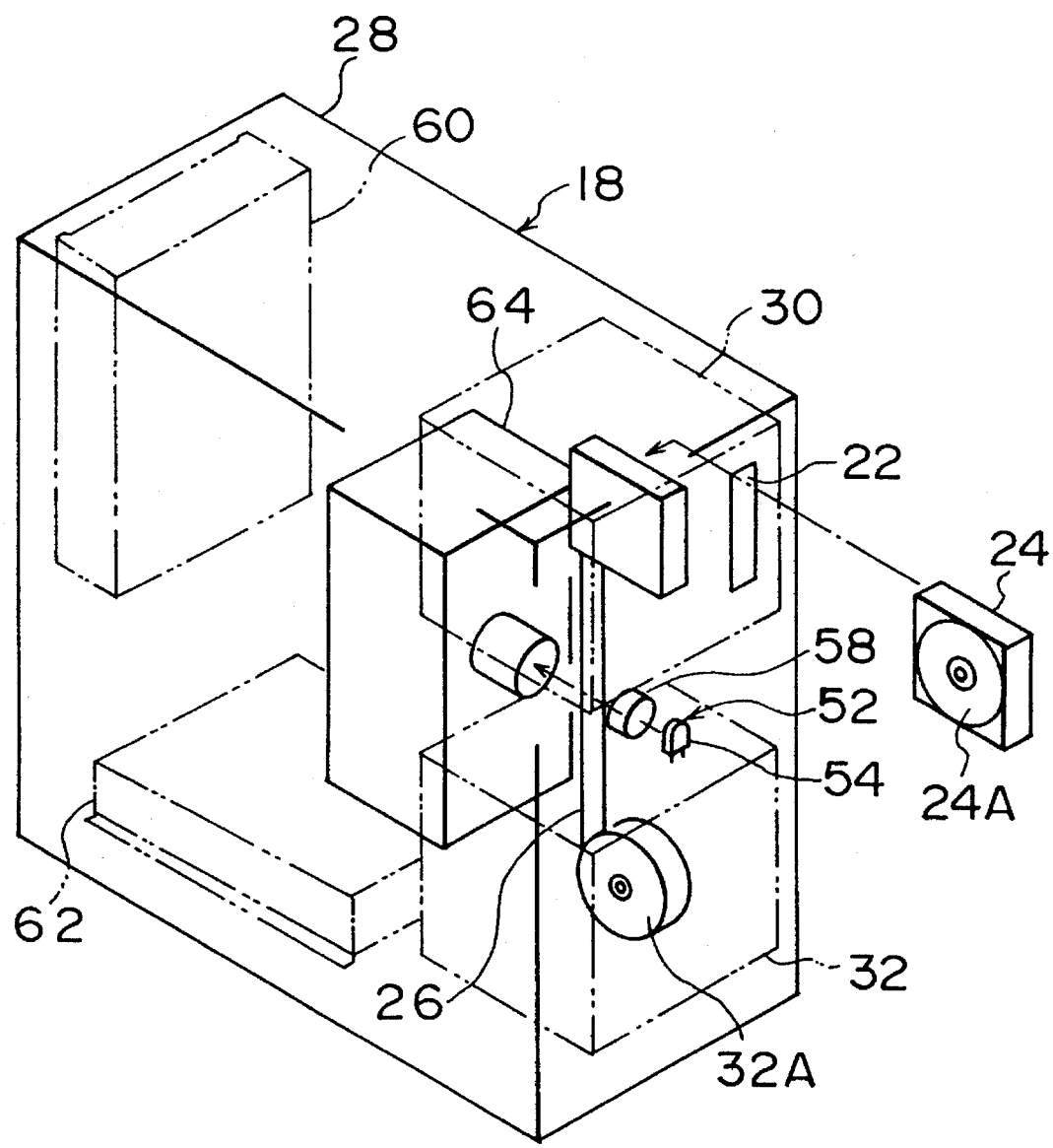
FIG. 2 is a perspective view illustrating the interior of a scanner according to the embodiment in FIG. 1.
Figure 3:
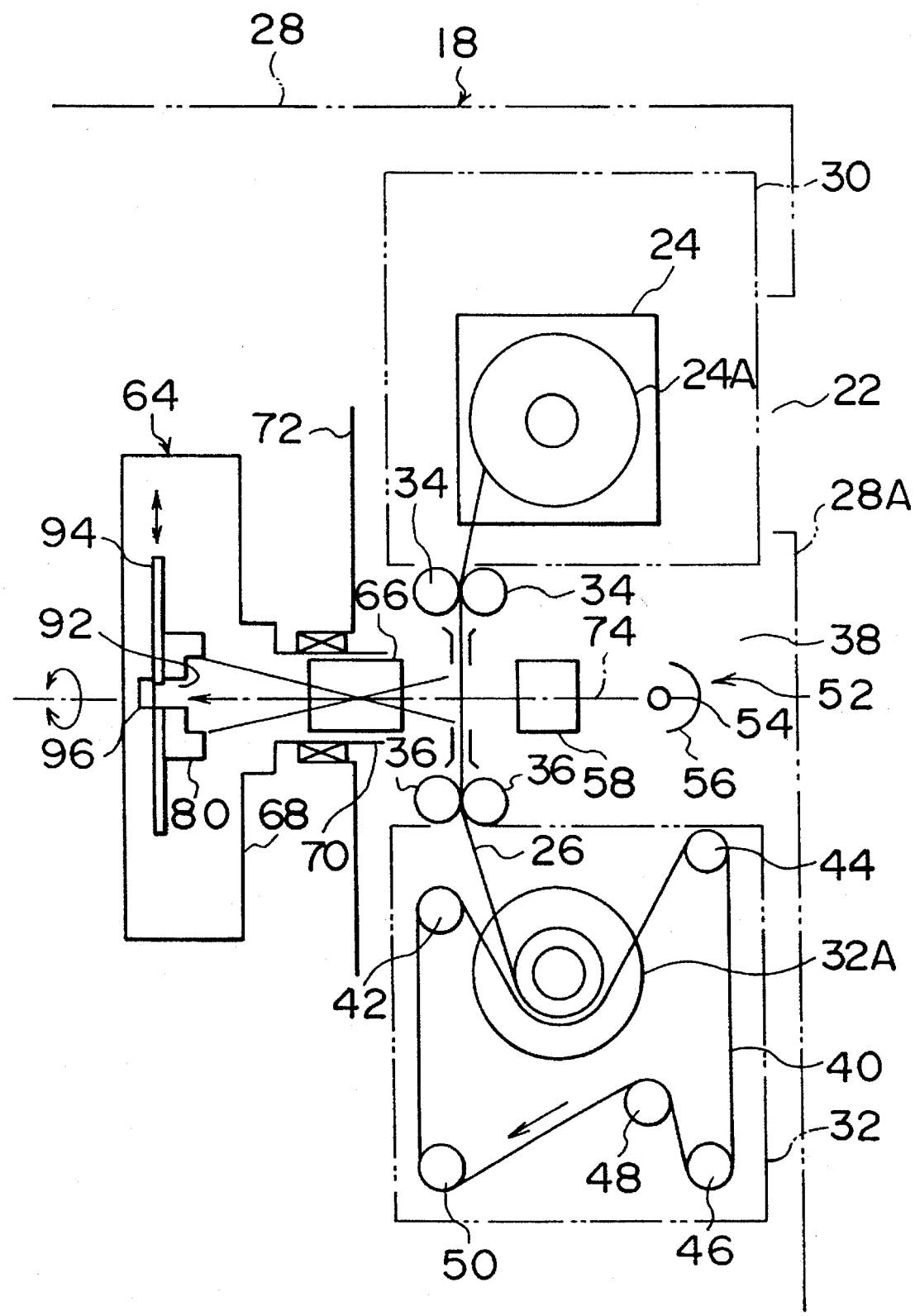
FIG. 3 is a side view illustrating an arrangement of main parts of the scanner shown in FIGS. 1 and 2.

When viewing the scanner 18 in FIGS. 2 and 3, the film 26 passes through the rear side of the open space between the reel driving units 30, 32, that is, the film 26 passes through at the inner back side viewed from the front of the casing 28. Referring to FIG. 3, there are shown guide rollers 34, 34, 36 and 36 for guiding the film 26. Accordingly, a space 38 is defined by the open area between the reel driving unit 30, 32 and a front panel 28A of the casing 28, and a light source 52, which will be described later, is housed in this space 38.

The take-up reel driving unit 32 has a drive belt 40 which travels while contacting the reel 32A as shown in FIG. 3. The drive belt 40 is wound on guide rollers 42 and 44, a drive roller 46, an encoder 48 and a tension roller 50, and it is driven by the drive roller 46 in a film take-up direction (indicated by an arrow in FIG. 3).

The light source 52 is housed in the space 38 between the above-described two reel driving units 30 and 32, and includes a lamp 54, a reflection mirror 56, a condenser lens 58, and an appropriate filter. In FIG. 2, a power supply circuit 60 and a power control circuit 62 for controlling an actuator such as a motor are illustrated.

Figure 4:
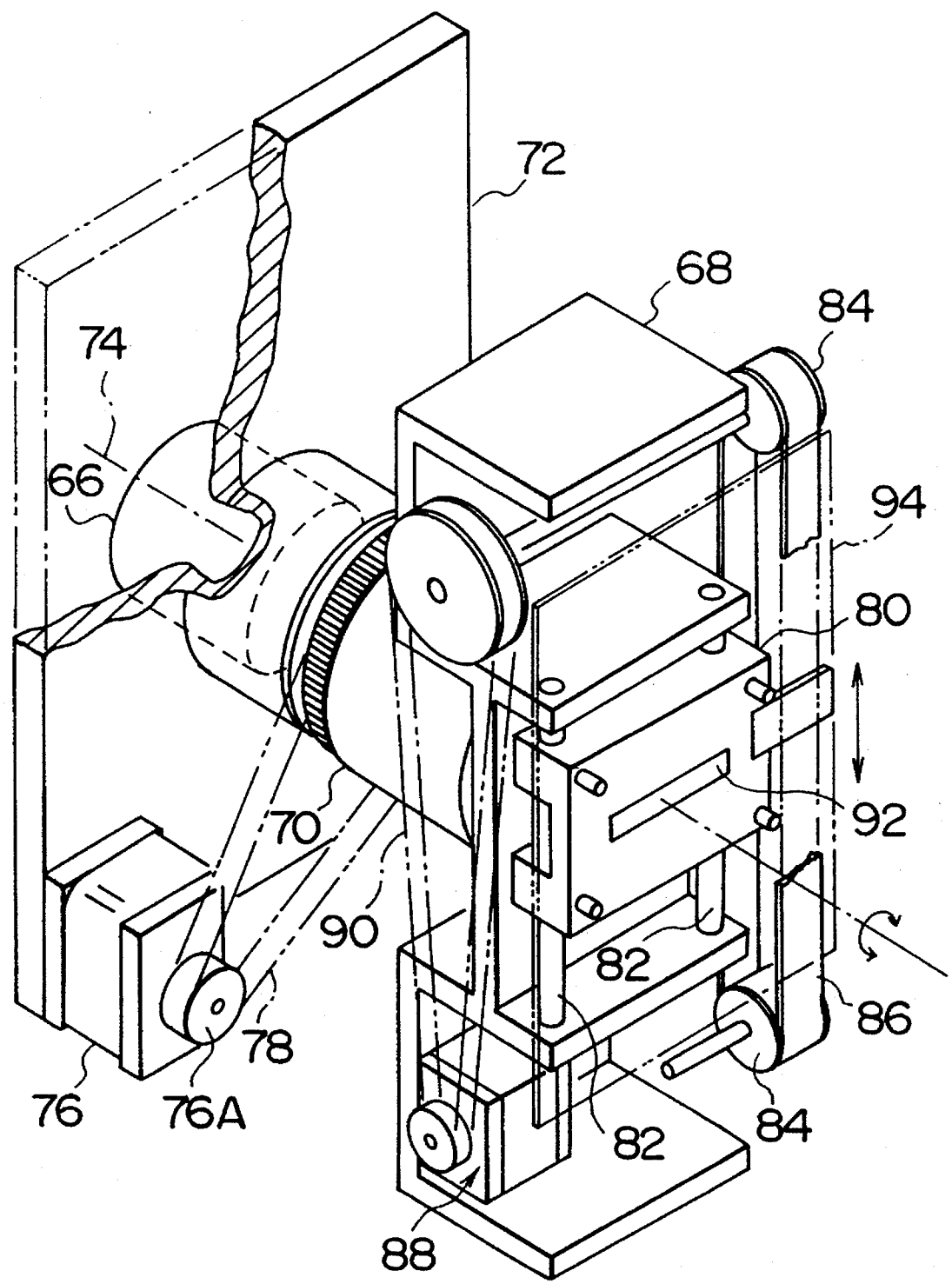
FIG. 4 is a perspective view illustrating a line sensor unit in the scanner in FIG. 3.

A line sensor unit 64 will now be described. The line sensor unit 64 is integrated with a projection lens 66. More specifically, as shown in FIGS. 3 and 4, a cylindrical portion 70 for holding the projection lens 66 is integrally formed with a frame (rotatable frame) 68 of the line sensor unit 64. The projection lens 66 mounted in the cylindrical portion 70 is a fixed focus lens with a magnifying power of approximately two. The cylindrical portion 70 is rotatably supported by a frame (fixed frame) 72, which is secured to the casing 28, so that the inclination of an image to be read may be corrected. The cylindrical portion 70 rotates about a light axis 74 perpendicular to the surface of the film 26.

A belt 78 is wound around the cylindrical portion 70 and a pulley 76A of a servo motor 76 mounted on the fixed frame 72. As the servo motor 76 rotates, the rotary frame 68 rotates around the light axis 74.

On the rotary frame 68, a movable plate 80 is provided on the side opposite to the cylindrical portion 70 as shown in FIG. 4. The movable plate 80 is slidably mounted on a pair of guide rods 82, 82 to permit the movable plate 80 to reciprocate in the vicinity of an opening of the cylindrical portion 70 in a direction perpendicular to the light axis 74.

In the rotary frame 68, a belt 86 wound on pulleys 84, 84 extends in a direction parallel to the up-and-down moving direction of the movable plate 80, and one side of the movable plate 80 is fixed to the belt 86. The rotation of a servo motor 88 is transmitted via a belt 90 to one of the pulleys 84. With this structure, when the servo motor 88 rotates forward and in reverse, the movable plate 80 reciprocates across a plane perpendicular to the light axis 74.

On the movable plate 80, an elongated window (narrow slit) 92 is formed in a direction perpendicular to the guide rods 82, 82, i.e., in a direction perpendicular to the up-and-down moving direction of the movable plate 80. The window 92 has its longitudinal center that corresponds with the light axis 74. A printed circuit board 94 is fixed to the rear face of the movable plate 80, i.e., the face opposite to that facing the cylindrical portion 70, so as to be perpendicular to the light axis 74.

A longitudinal CCD arrayed line sensor 96 is fixed to the board 94 to face the window 92 (FIG. 3). In addition, a preamplifier for amplifying the output of the line sensor 96 is mounted on the board 94. The positioning of the light reception face of the CCD line sensor 96 must correspond to a plane on which an image projected from the projection lens 66 is focused.

Figure 5:
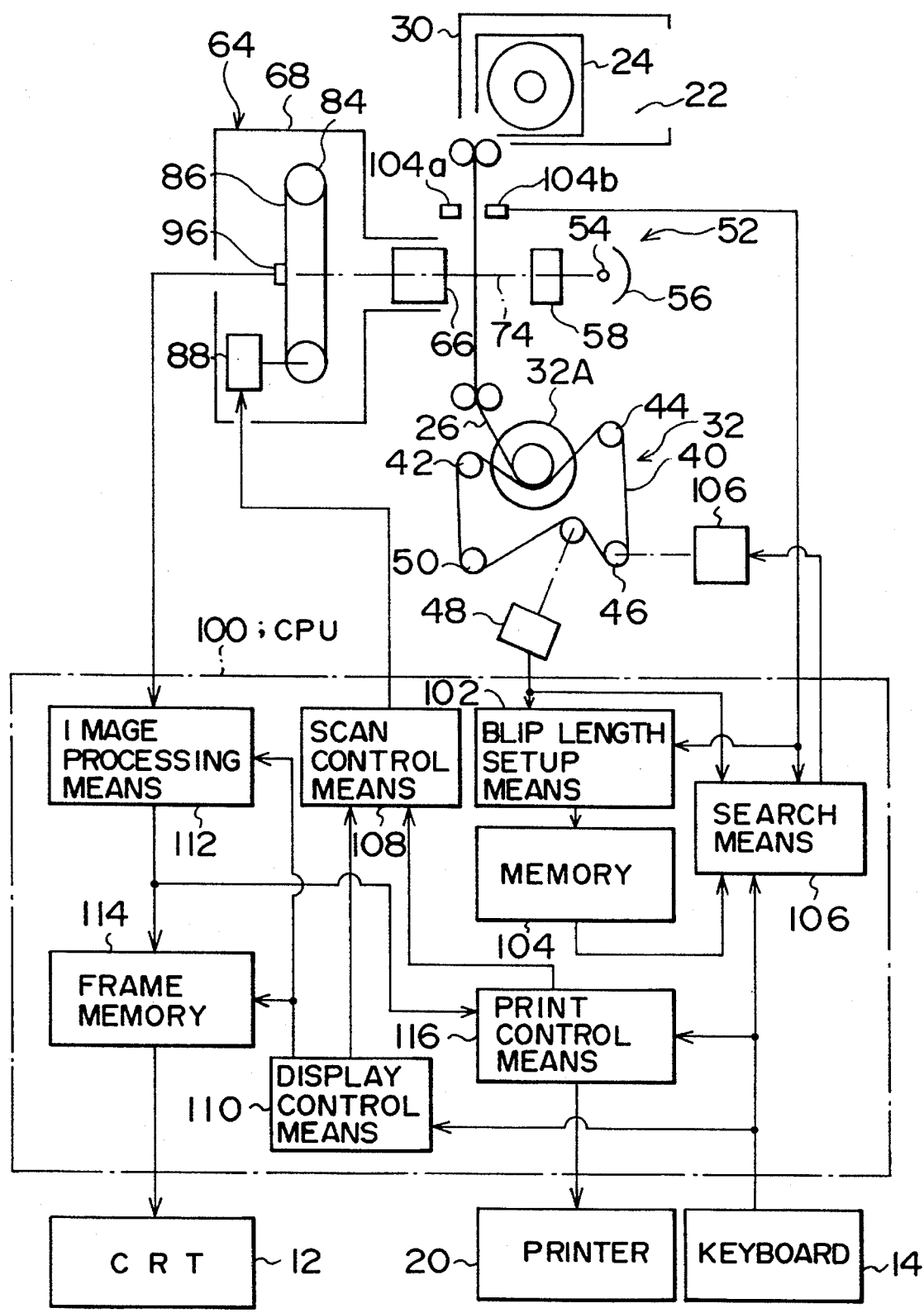
FIG. 5 is a schematic block diagram illustrating a control system according to the embodiment.

A CPU 100 incorporated in the computer main body 10 serves as control means for the microfilm reader as a whole. The CPU also has various functions as shown in FIG. 5. Although these functions are actually software routines, FIG. 5 illustrates the functions as a schematic block diagram for convenience.

Reference numeral 102 represents a blip length setup means for determining and setting up a permissible range or an allowance of a blip length to be detected as a document mark. Prior to the search process for searching a desired frame from the film, the blip length setup means 102 feeds the film 26 from the leading end to the trailing end, and measures the lengths of the blips 27 printed adjacent to each frame of the microfilm (preliminary search at step 200 in FIG. 8). This measurement is conducted by employing the output of a blip sensor 104b and the output of the rotary encoder 48. The blip sensor 104b is positioned opposite a light emitting device 104a and the blip marks 27 on the microfilm run between the blip sensor 104b and the light emitting device 104a. The blip sensor 104b generates an ON signal as long as it senses the blip 27. The ON signal from the blip sensor 104b and the output from the encoder 48 indicating the running speed of the microfilm 26 are fed to the blip length setup means 102 where the length of each blip 27 is determined.

Figure 7:
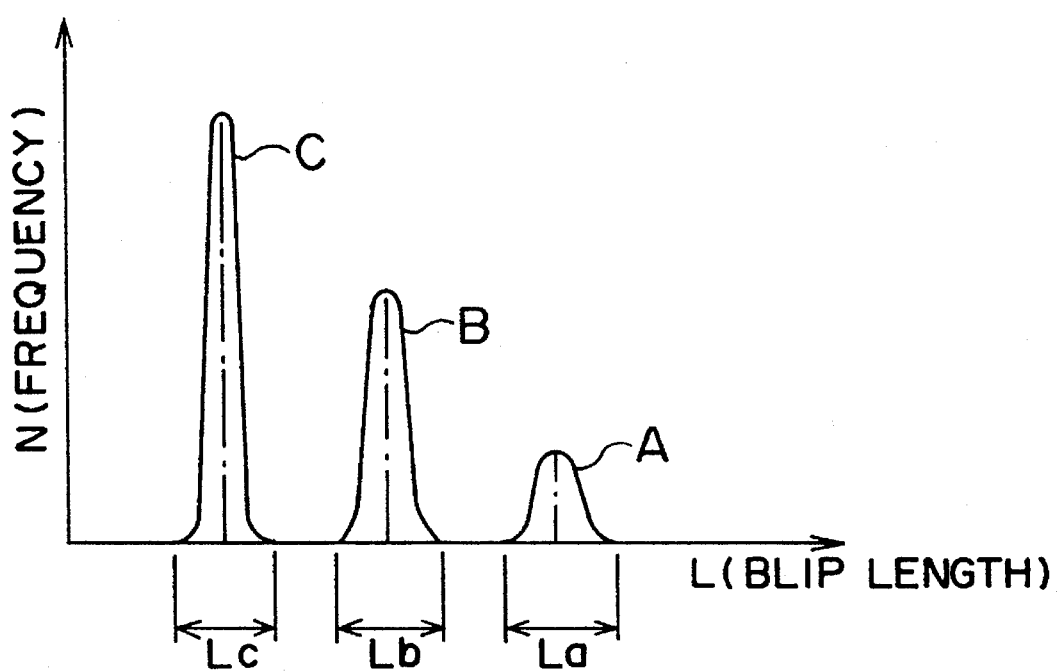
FIG. 7 is a graph showing histograms for detected blip lengths.
Figure 8:
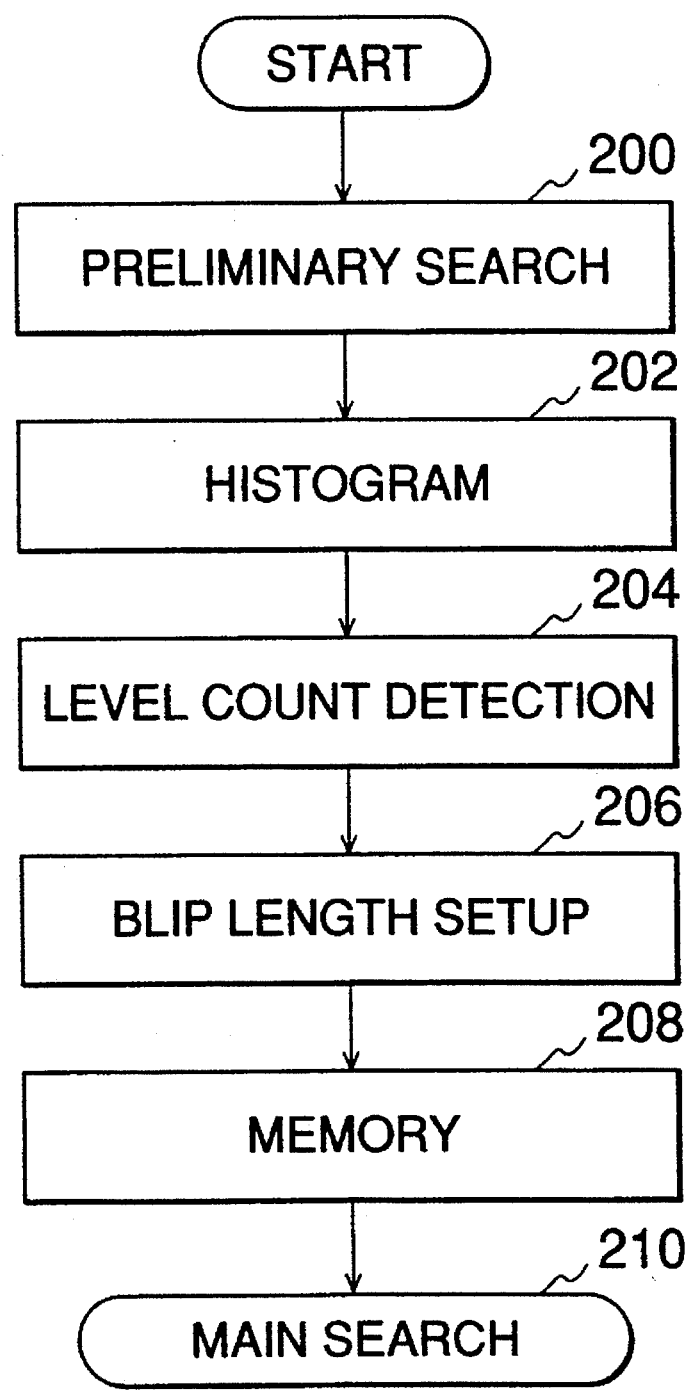
FIG. 8 is a flowchart for the preliminary search processing.

Further, the blip length setup means 102 prepares a histogram showing the distribution of the measured blip lengths as shown in FIG. 7 (step 202 in FIG. 8). The histogram has three distribution peaks A, B and C, each corresponding to the blips 27a, 27b and 27c which have different lengths and represent different classification levels of the recorded images on the frames. The number of levels represented by the blips 27 are determined in consonance with the number of peaks in the histogram (step 204). Since the number of the distribution peaks in this case is three, A, B and C, in this embodiment there are three levels represented by the blips. Permissible ranges La, Lb and Lc for the blips 27a, 27b and 27c are determined using the bases of the peaks A, B and C (step 206). Then, the obtained permissible ranges or allowance of blip lengths are stored in a memory 104 (step 208).

Search means 106 searches and detects a desired frame by using the blips 27, while it again feeds the film 26 from the beginning (main search at step 210). Specifically, the search means 106 detects a blip length L by using the output of the blip sensor 104b and the rotary encoder 48, and determines in which permissible range, La, Lb or Lc, the acquired blip length L falls. When the acquired blip length L is within the permissible range La, that blip is regarded as the long blip 27a. Similarly, if the blip length L falls in the permissible range Lb or Lc, the blip is regarded as the medium length blip 27b or the short blip 27c. A desired frame is searched and detected by counting the individual blips 27a, 27b and 27c.

For an automatic search operation, a desired frame is automatically detected in the above described manner, and the detected frame is appropriately positioned so that the photographed image in the frame is located within the scanning range of the line sensor 96. For a manual search operation, a film feeding key (not shown), which is provided on the keyboard 14, is manually manipulated to control the feeding direction and the feeding speed of the film 26.

In the case of the manual search, scan control means 108 maintains the line sensor 96 on the light axis 74. After detection of the target frame, the scan control means 108 activates the line sensor unit 64 for scanning an image to be output to the printer 20, etc. In other words, the scan control means 108 actuates the motor 88 to move the line sensor 96 in the subsidiary scanning direction, that is, parallel to the image focusing face, to read a projected image.

For an automatic search, unlike a manual search, an image on the film 26 does not have to be displayed on the CRT display means 12. When an operator must verify the image recorded in a target frame which has been detected as a result of an automatic search, however, the image may be displayed on the CRT display means 12 as it is for a manual search. It should be noted that the lamp 54 of the light source 52 is turned on during the search and scanning processes.

By an instruction from the keyboard 14 to conduct the search operation, display control means 110 maintains the line sensor 96 in its center or home position on the light axis 74, and sequentially displays the images from the moving film 26 on the display means 12. More specifically, during the search operation, the display control means 110 detects the distance traveled by the film 26 from data output by the rotary encoder 48, and permits the line sensor 96 to perform a main scan in the horizontal direction of the film 26 at constant movement intervals (intervals that correspond to the distances between subscanning lines).

Various processes are performed on the output of the line sensor 96 by image processing means 112, and the resultant signal is stored at a predetermined address in a frame memory 114. The processes performed by the image processing means 112 are, for example, a process for correcting the output of the line sensor 96 by compensating for idiosyncratic non-alignment of individual pixels, monochrome image inversion (reversal of the negative and positive colors), enlargement and reduction of an image, image trimming, image masking, etc.

Processed image signals are sequentially stored in the frame memory 114. The display control means 110 employs the data in the frame memory 114 to display on the display means 12 an image that corresponds to the display range of the film 26. The process up to this point is repeated while the film is moving, and images on the moving film 26 can be sequentially displayed on the display means 12 so that they are substantially the same as images that are projected and displayed on a screen.

Print control means 116 outputs an instruction to the scanner 18 to read at a high resolution an image in a desired frame which has been detected by the search process, and transmits the read image data to the printer 20 for printing. First, following the entry of a printing instruction through the keyboard 14, a target frame is shifted to an appropriate position along the light axis 74. The image recorded on the frame is read twice by employing a preliminary scan and a main or real scan. During the preliminary scanning, an image is read at a low resolution to detect a black frame and to correct the inclination of the image. Then, during the main scanning, the image is read at a high resolution to obtain image data for the printing.

The black frame is a peripheral portion of a document, i.e., a portion which appears in the external area of the document image when printed. There are various known types of algorithms for detecting such a black frame. For example, when the scanning line runs from the black frame to the document image area, a predetermined number or more contiguous black pixels turns to a series of continuous white pixels on the scanning line, so that a boundary between the black frame and the document can be detected.

After the black frame is detected, the inclination angle of the projected and read document image is discriminated by detecting the inclination angle of the image frame of the rectangular projected image. Then the motor 76 is actuated to correct the inclination of the image frame. As a result, the entire line sensor unit 64 is rotated to set the line sensor 96 parallel to one side of the projected image.

After the image has been read during the main scanning, the image processing means 112 performs predetermined image processing on the output of the line sensor 96. For example, the image processing means 112 performs a correction process (CCD pixel compensation) to remove the influence on the output of the line sensor 96 of the idiosyncratic non-alignment of individual pixels, and processes for image contrast, image inversion, image enlargement and reduction, spacial filtering processing, trimming, masking, etc. An image signal obtained as a result of the process is output to the printer 20.

In the image processing, the moving speed of the line sensor 96 in the subsidiary scanning direction is changed in consonance with the magnification ratio (scale factor). More specifically, if a set magnification is higher than a reference magnification (for example, a magnification at which the pixels read by the line sensor 96 can be output neither intermittently nor overlapping), the feed speed of the line sensor 96 is lowered. If a set magnification ratio is lower than the reference magnification, the feed speed of the line sensor 96 is increased. It should be noted that these speeds are inversely proportional to a ratio of the set scale factor to the reference magnification ratio.

An amount of light for an exposure may be automatically adjusted at the time of the preliminary scanning and the main scanning, so that the output level of the line sensor 96 falls within a specific range. That is, by altering the clock frequency of the line sensor 96, the time available for the accumulation of pixels can be changed and the amount of received light can be controlled. Further, by changing the intensity of the illumination of the lamp 54, the amount of light received by the line sensor 96 can also be changed.

The operation of this embodiment will now be described. When the cartridge 24 is inserted into the cartridge insertion port 2 and loaded in the feed reel driving unit 30, the leader portion of the roll film 26 is pulled out downward. Then, the leader portion of the film 26 is guided to the take-up reel driving unit 32 by the guide rollers 34, 34, 36 and 36. The leader portion of the film 26 is sandwiched between the reel 32A and the drive belt 40 and then wound on the reel 32A.

After completion of the loading of the film 26, to perform the preliminary search (step 300 in FIG. 9), the film 26 is fed until the end of the film is reached, and the permissible ranges La, Lb and Lc for the blip length L are determined (step 302). The permissible ranges La, Lb and Lc are stored in the memory and are employed for the detection of the blips and discrimination of the blip levels during an automatic search, which will be performed later.

Figure 9:
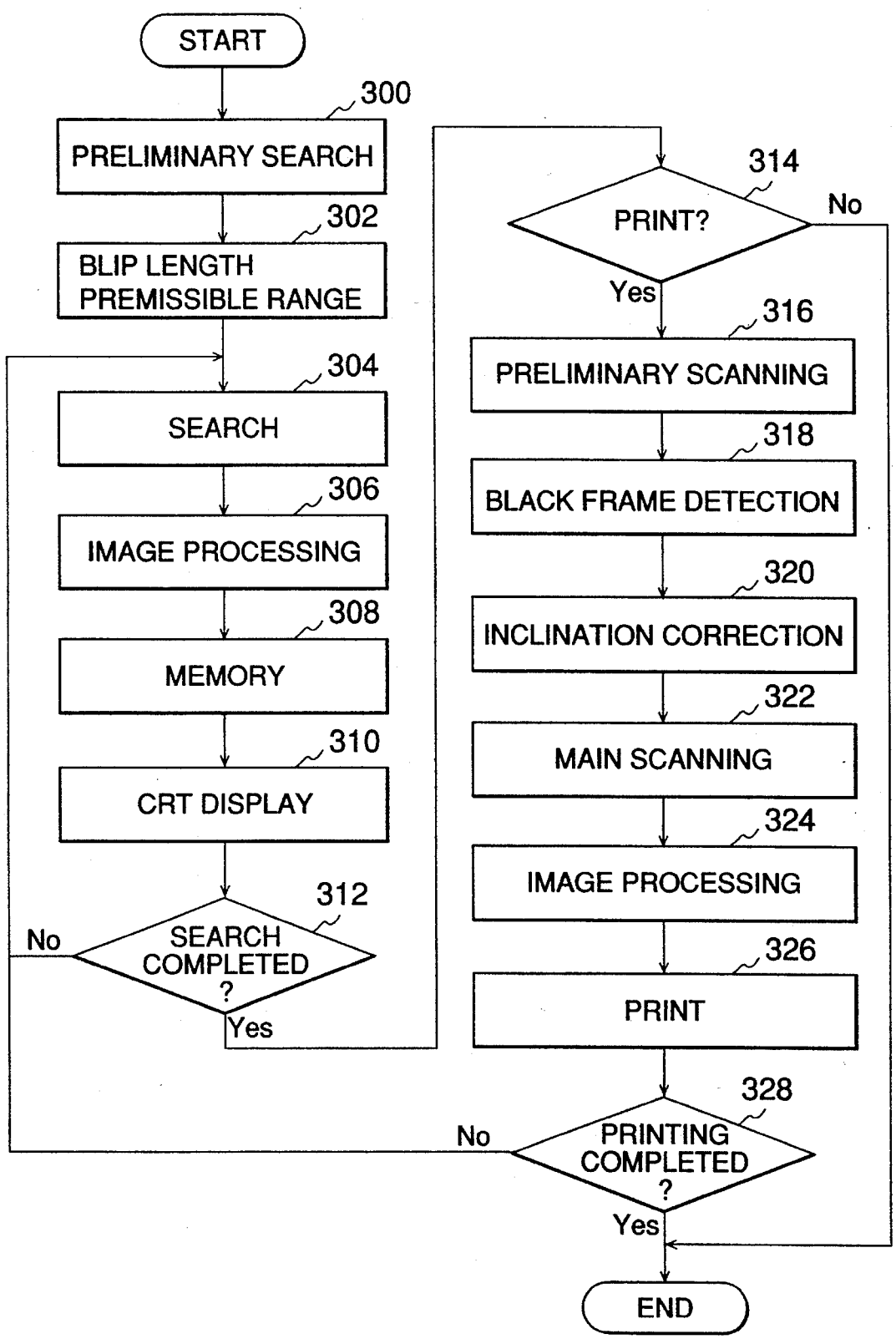
FIG. 9 is a flowchart showing for all the processing according to the embodiment.

In the case of a manual search, the film feeding direction and the feeding speed are set through the keyboard 14, and then the film 26 is fed (step 304 in FIG. 9). In synchronization with the feeding of the film, image processing is performed for images read by the line sensor 96 (step 306), and processed image data is sequentially stored in the frame memory 114 (step 308).

As a result, the images on the moving film 26 are sequentially displayed on the display means 12 in the same manner as on a projection screen (step 310). For an automatic search, the address of a desired frame is input at the keyboard 14 or is received from another computer. At this time, the images on the film 26 either may or may not be sequentially displayed on the display means 12.

After the search operation has been completed (step 312) and when printing is instructed by the keyboard 14 (step 314), the line sensor 96 performs preliminary scanning at a high speed (step 316) and reads an image on the target frame at a low resolution. When a black frame is detected (step 318) and the inclination of the image is corrected (step 320), the line sensor 96 then performs main scanning (step 322). During the main scanning, the line sensor 96 reads an image at a high resolution with a low scanning speed, and image processing is performed on the thus read image (step 324). The high resolution image is output to the printer 20 (step 326). After this printing process, if the printing of an image in another frame is required, program control returns to step 304 to perform a search (step 328).

In the above described embodiment, movement of the line sensor 96 is stopped, images are continuously read while the film 26 is moving, and the moving images are sequentially displayed on the CRT display means. According to the present invention, for an automatic search, images do not have to be displayed on the display means 12, and the display on the display means 12 may be omitted. In addition, when an image is to be displayed on the display means 12, an image in the frame that has been the subject of a search may be displayed as a static image.

Further, according to the present invention, when the blips 27 represent multiple levels, such as, intermediate and low levels, the number of levels can be detected simultaneously. The number of levels may also be set manually.

In a conventional microfilm reader or projector, the light source 52 and the projection lens 66 are usually arranged in the horizontally-reverse direction to those of the embodiment shown in FIG. 3. Thus, when a microfilm such as used for a conventional device is used for this embodiment, the projected image will be reversed to be a mirror image. In this case, it can be electrically converted to a correct image through known image processing. When a negative film is employed, only electrical monochrome inversion need be performed.

In the above embodiment, the line sensor unit 64 is rotated to correct the inclination of a projected image. Instead of the rotation of an optical system, read image data may be electrically rotated by image processing. If unnecessary, the inclination of an image need not be corrected.

Although the projection lens 66 of the scanner 18 in the above-described embodiment has a fixed focus, the present invention is not limited to this arrangement. For example, an automatic focusing mechanism may be provided. In this case, the automatic focusing can be performed during the preliminary scanning.

The display means 12 is not limited to a CRT display device, and may be a liquid crystal panel, a plasma display or other display device. The output device is also not limited to the printer 20. The image data may be stored in an external memory, such as a magneto-optical disk, or may be transferred to another image processor.

In this embodiment, if the lamp 54 is turned on only when the line sensor 96 is activated for scanning, the power consumed can be reduced. Since the heat generated by the lamp 54 is also reduced, the cooling system for the lamp 54 can be simplified. The lamp 54 can be designed so that it is turned on when the cartridge 24 is loaded into the scanner 18 and is turned off when the cartridge 24 is removed therefrom.

Although the present invention relates to a microfilm reader, the method of the present invention can be applied to the reading of other photographic films, X-ray films, and printed material other than films, and can provide the same effect as is obtained for microfilm. Further, a two-dimensional image sensor may be used instead of a line sensor, or an image sensor may be positioned close to the film it reads.

As is described above, according to the present invention, before a search of the target frame, the lengths of all of blips on the microfilm are detected, and the permissible ranges for the blip lengths are acquired from a histogram that is prepared based on the detection results. The blips can be precisely distinguished from one another during a search, and search errors seldom occur.

What is claimed is:

1. A method for searching for a desired frame by detecting blips on a microfilm, comprising the steps of:

a) detecting lengths of all blips adjacent to frames on said microfilm;

b) determining permissible ranges for blip lengths from a frequency histogram reflecting relative distributions for said lengths of said blips that are detected; and c) counting blips whose lengths fall within said permissible ranges, and searching for said desired frame on said microfilm.

2. The method according to claim 1, wherein said blips are classified into plural levels having different lengths, and said permissible ranges for said blip lengths for respective levels are determined from said histogram for said levels.

3. A microfilm reader which searches for a desired frame by detecting blips on a microfilm, comprising:
  a) a blip sensor for detecting said blips;
  b) a rotary encoder for detecting a running speed of said microfilm;
  c) blip length setup means for detecting lengths of all blips adjacent to frames on said microfilm, in consonance with outputs of said blip sensor and said rotary encoder, and for determining permissible ranges for blip lengths from a frequency histogram reflecting relative distributions for said lengths of said blips; and
  d) search means for counting blips whose lengths fall within said permissible ranges and for searching for said desired frame.

4. The microfilm reader according to claim 3, wherein said blips are classified into plural levels having different lengths, wherein said blip length setup means determines each of said permissible ranges for said blip lengths for said levels from said histogram, and wherein said search means counts said blips whose lengths fall within said permissible ranges acquired for said levels, and searches for desired frames identified by said levels.

* * * * *